Aug. 1, 1939.　　　F. BUSSE　　　2,168,190

PHOTOGRAPHIC ENLARGING APPARATUS

Filed Dec. 3, 1937　　　2 Sheets-Sheet 1

Ferdinand Busse.
Inventor

By　Attorney

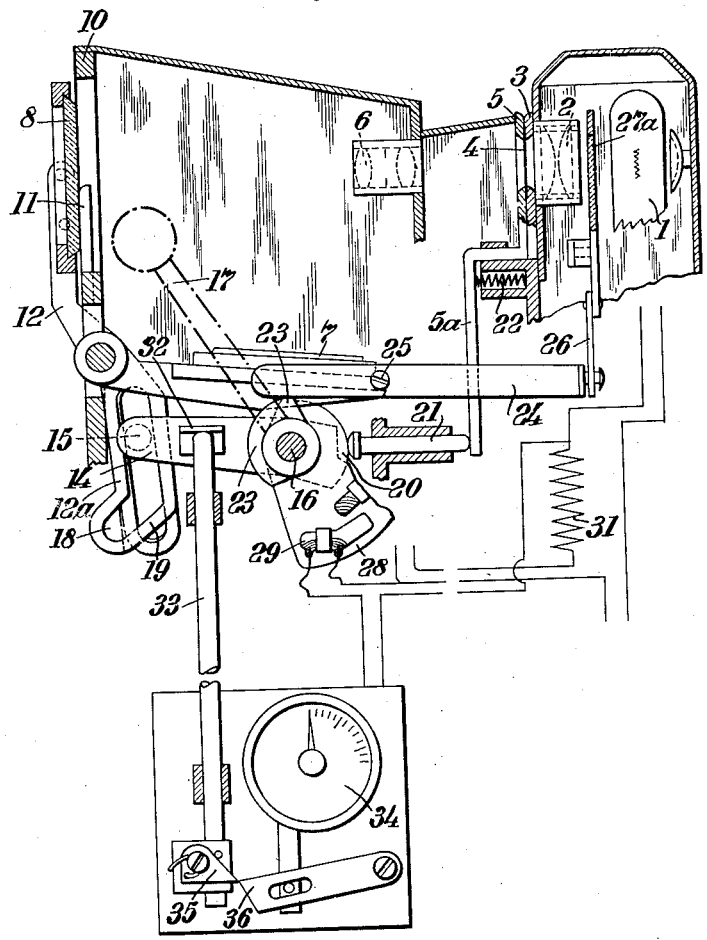

Patented Aug. 1, 1939

2,168,190

UNITED STATES PATENT OFFICE 2,168,190

PHOTOGRAPHIC ENLARGING APPARATUS

Ferdinand Busse, Munich, Germany, assignor, by mesne assignments, to Agfa Ansco Corporation, Binghamton, N. Y., a corporation of Delaware Application December 3, 1937, Serial No. 177,961
In Germany December 4, 1936

5 Claims. (Cl. 88—24)

The present invention relates to a photographic enlarging apparatus.

One of its objects is to simplify the manipulation necessary in photographic enlargement in order that photographic negatives may be correctly enlarged in the shortest possible time.

Figure 1:
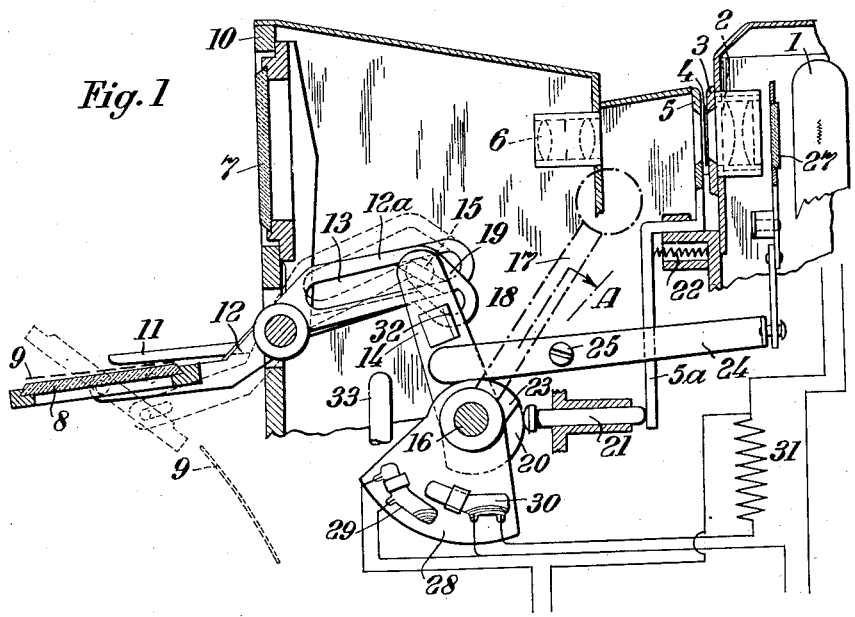
Figure 2:
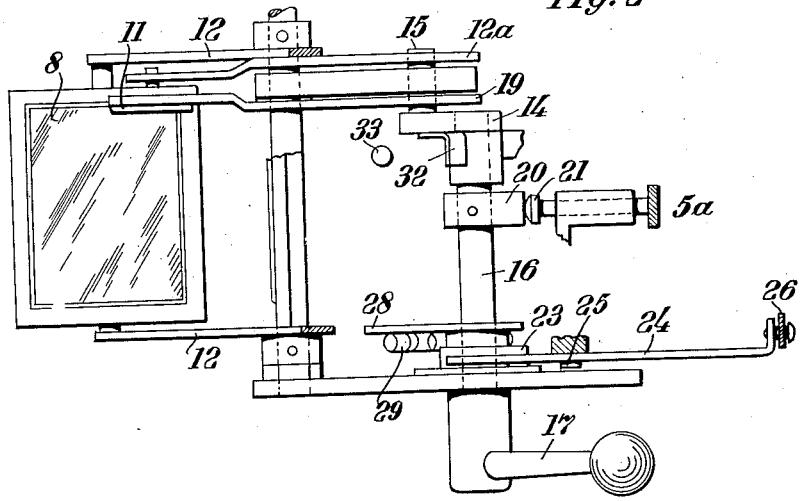

Further objects will be seen from the detailed description following hereinafter. Reference is made to the accompanying drawings in which Figure 1 is a sectional side view of an enlarging apparatus in position for examining the negative to be enlarged, Figure 2 is a plan of the lever mechanism of Figure 1, Figure 3 is a side view of the enlarging apparatus in the printing position, with a tensioning and release device for the exposure clock.

In accordance with the invention the means for examining the negative to be enlarged and for holding, exposing and ejecting the photographic material to be exposed are all controlled from a single controlling device. The controlling device may, for example, be a shaft provided with a lever operated by hand or foot and with cranks, cams, levers and switches whereby the parts necessary for the enlarging operation, for example the ground glass, the printing light, the holding plate and the like are controlled.

The invention is illustrated by the accompanying drawings.

The light from the source of light 1 passes through a heat screen 27 and a condenser 2 and falls on the negative 4 carried in the frame 3. The negative 4 is held firmly pressed against the frame 3 by a holding plate 5 during the printing operation; during the choice of the negative the plate 5 bears loosely thereon. An enlarged picture of the negative is projected by the objective 6 on the ground glass screen 7 where it can be comfortably viewed by the operator sitting in front of the apparatus. The screen 7 is fixed to a holding plate 8 which serves to press the photographic material (for example paper) 9 to be exposed against the frame 10 lying in the plane of the picture. A finger 11 holds the paper 9 fast as the plate 8 is pushed against the frame 10. The screen 7 and plate 8 are mounted at an angle to one another in a support 12. The part 12a of the support 12 has a slot 13 in which engages a pin 15 fixed to a lever 14. The lever 14 is mounted on the main driving shaft 16, which is operated by a handle 17. The pin 15 also engages in a slot 18 in a lever 19, and thereby operates the finger 11 which is mounted on the lever 19. The shaft 16 also carries a cam 20 which presses the holding plate 5 onto the negative 4 by a pin 21 and lever 5a, against the action of a spring 22. Another cam 23 on the shaft 16 bears against a lever 24 turning on a pin 25. The lever 24 operates a rod 26 on which a screen 27a for scattering the light and the heat screen 27 are mounted. According to the position of the handle 17 either the screen 27a or the filter 27 is placed in the path of the printing light. A sector 28 is also mounted on the shaft 16; it carries two mercury switches 29 and 30. According to the position of the handle 17 a resistance 31 is switched in (Figure 1) or out (Figure 3) of the circuit of the lamp 1. A bracket 32 on the lever 14 tensions the exposure clock 34 by a rod 33 and releases at the appropriate instant for the exposure by the pawls 35 and 36.

The enlarging apparatus operates as follows:

The negative 4 is placed between the holding plate 5 and the frame 3 and is moved until the desired enlarged picture appears on the ground glass 7. This position is shown in Figure 1. The corresponding position of the handle 17 is shown in chain lines. At this position of the handle 17 and of the switch 30 the resistance 31 is included in the circuit of the lamp 1, so that the latter does not glow at its full strength. Furthermore the lever 24 is raised by the cam 23 so that the heat screen 27 lies in the beam of light. The optical arrangement of the apparatus is now such that the illumination is adjusted and less voltage is used, thus lengthening the life of the lamp, and that heat is absorbed from the light falling on the condenser. The holding plate 5 which is controlled from the shaft 16 by the cam 20 and the rods 5a and 21 is raised against the action of the spring 22 from the negative 4, so that the film can be moved in its film guides. By the lever rods 12—19 the ground glass screen 7 is held in the plane of the picture while the holding table 8 has the position shown in Figures 1 and 2. The finger 11 is pressed by the rods 12—19 against the paper 9 or the table 8 as soon as the handle 17 is moved in the direction opposite to that of the arrow A. By this movement the lamp 1 is switched right off owing to the breaking of the mercury thread in the switch 30 and is later given the full voltage owing to the short circuiting of the resistance 31 by the switch 29, as shown in Figure 3. Furthermore owing to the cams 20 and 23 the scattering screen 27a takes the place of the heat screen 27 and the plate 5 is pressed hard against the negative 4 so that now the enlarging apparatus is operated with scattered light. Meanwhile the ground glass screen 7 and the holding plate 8 have adopted the position shown in Figure 3 and the exposure clock 34 has been tensioned by the rod 33 pressed down by the bracket 32. The pawl 35 is so formed that its point can move over the point of the lever 36. At the moment when the relative positions are reversed the clock automatically starts and runs for the length of time for which it has been adjusted. When the exposure is complete, the handle 17 is moved in the direction of the arrow A (Figure 1) beyond the starting position, whereby the plate 8 is tilted (as shown in dotted lines) and the exposed paper 9 falls into a receptacle.

What I claim is:

1. In a photographic enlarging apparatus, a negative holder comprising a pressure plate, a source of light and means for varying the illumination thereof, a heat screen movably mounted between the negative holder and the source of light, a ground glass projection screen in position to receive light transmitted by a negative supported in the negative holder, a platen, a means for releasing photographic material from said platen and a single actuating means for moving said ground glass projection screen out of the path of the light transmitted by said negative, moving the platen into the position previously occupied by said projection screen, actuating the pressure plate of said negative holder, moving said heat screen out of the path of the light striking the negative, increasing the illumination of said source of light to copying strength and actuating the means for releasing the photographic material from said platen.

2. In a photographic enlarging apparatus, a negative holder comprising a pressure plate, a source of light and means for varying the illumination thereof, a heat screen movably mounted between the negative holder and the source of light, a ground glass projection screen in position to receive light transmitted by a negative supported in the negative holder, a platen, a means for releasing photographic material from said platen and a single shaft provided with means for moving said ground glass projection screen out of the path of the light transmitted by said negative, moving the platen into the position previously occupied by said projection screen, actuating the pressure plate of said negative holder, moving said heat screen out of the path of the light striking the negative, increasing the illumination of said source of light to copying strength and actuating the means for releasing the photographic material from said platen.

3. In a photographic enlarging apparatus, a negative holder comprising a pressure plate, a source of light and means for varying the illumination thereof, a heat screen movably mounted between the negative holder and the source of light, a ground glass projection screen in position to receive light transmitted by a negative supported in the negative holder, a platen pivotally connected therewith, a means for releasing photographic material from said platen and a single shaft provided with means for moving said ground glass projection screen out of the path of the light transmitted by said negative, moving the platen into the position previously occupied by said projection screen, actuating the pressure plate of said negative holder, moving said heat screen out of the path of the light striking the negative, increasing the illumination of said source of light to copying strength and actuating the means for releasing the photographic material from said platen.

4. In a photographic enlarging apparatus, a negative holder comprising a pressure plate, a source of light and means for varying the illumination thereof, a heat screen movably mounted between the negative holder and the source of light and connected to a screen for scattering light, a ground glass projection screen in position to receive light transmitted by a negative supported in the negative holder, a platen pivotally connected therewith, a means for releasing photographic material from said platen and a single shaft provided with means for moving said ground glass projection screen out of the path of the light transmitted by said negative and simultaneously moving the platen into the position previously occupied by said projection screen by means of said pivotal mounting, actuating the pressure plate of said negative holder, moving said heat screen out of and said screen for scattering light into the path of light striking the negative, increasing the illumination of said source of light to copying strength and actuating the means for releasing the photographic material from said platen.

5. In a photographic enlarging apparatus, a negative holder comprising a pressure plate, a source of light and means for varying the illumination thereof, a heat screen movably mounted between the negative holder and the source of light and connected to a screen for scattering light, a ground glass projection screen in position to receive light transmitted by a negative supported in the negative holder, a platen pivotally connected therewith, a finger adapted to hold photographic material onto said platen, a means for tilting said platen to release said photographic material therefrom, an exposure clock and a single shaft provided with means for moving said ground glass projection screen out of the path of the light transmitted by said negative and simultaneously moving the platen into the position previously occupied by said projection screen by means of said pivotal mounting, actuating the pressure plate of said negative holder, moving said heat screen out of and said screen for scattering light into the path of light striking the negative, actuating said exposure clock, increasing the illumination of said source of light to copying strength, returning the elements enumerated to their original status by the action of means connected to said exposure clock and said single shaft and actuating the means for tilting said platen to release the photographic material.

FERDINAND BUSSE.